March 17, 1942. P. M. FARMER 2,276,294
ARTICLE ORDER SEGREGATING SYSTEM AND APPARATUS THEREFOR
Filed June 10, 1939 3 Sheets-Sheet 1
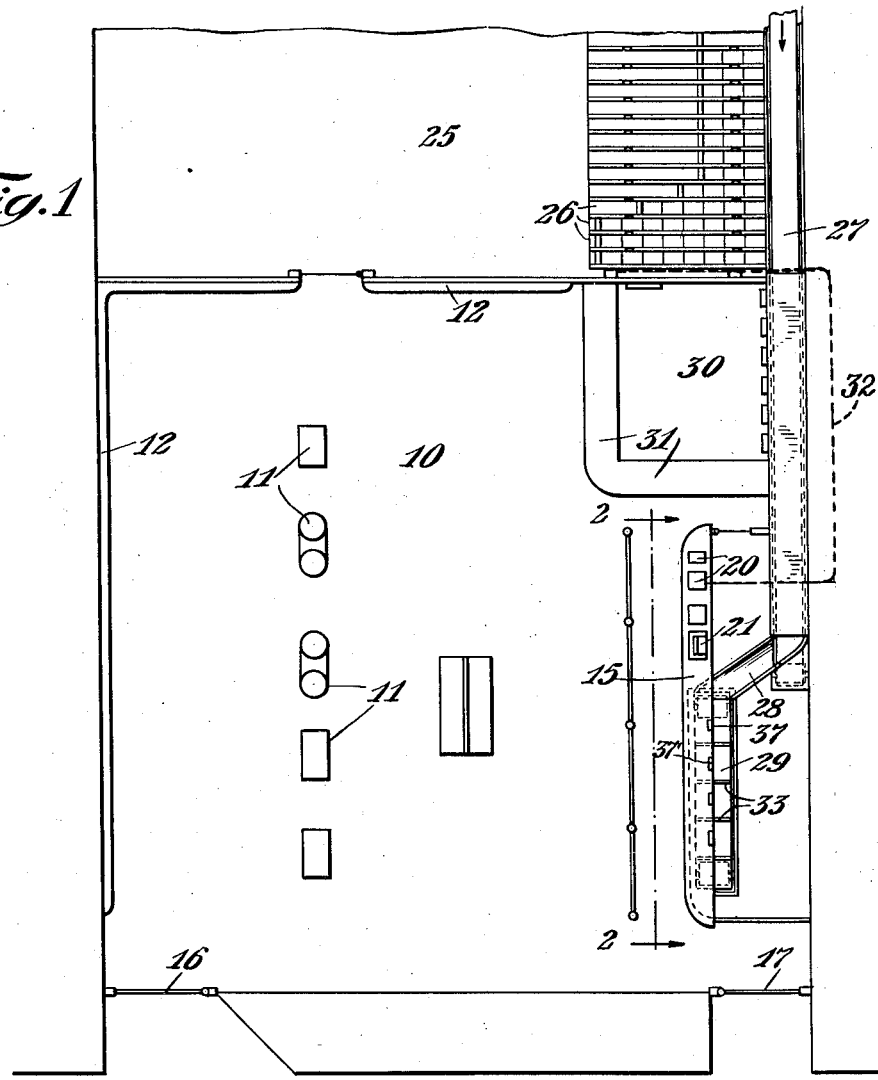
INVENTOR
P. M. Farmer
BY
ATTORNEY

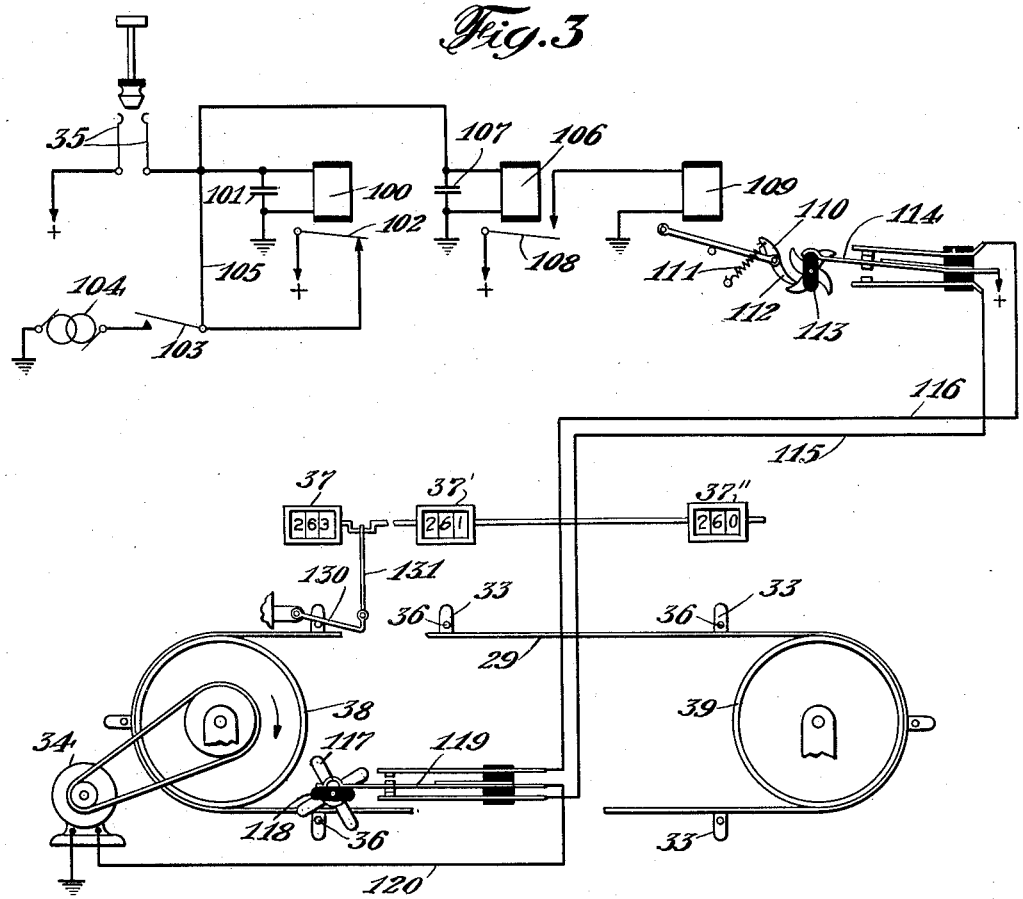

March 17, 1942.   P. M. FARMER   2,276,294
ARTICLE ORDER SEGREGATING SYSTEM AND APPARATUS THEREFOR
Filed June 10, 1939   3 Sheets-Sheet 3

INVENTOR
P. M. Farmer
BY
ATTORNEY

Patented Mar. 17, 1942

2,276,294

UNITED STATES PATENT OFFICE 2,276,294

ARTICLE ORDER SEGREGATING SYSTEM AND APPARATUS THEREFOR

Paul M. Farmer, Maplewood, N. J.

Application June 10, 1939, Serial No. 278,543

11 Claims. (Cl. 186—1)

This invention pertains to an improved apparatus for handling and delivering articles to a point where they are dispensed to the purchaser, user, or transportation factor. More particularly, the improved apparatus is especially adapted for use in markets, stores, warehouses, manufacturing establishments, and the like, where articles of merchandise or of any other character are selectively assembled at one or more designated locations, the articles being originally stored in quantity in a central location such as a stockroom.

The dispensing and article handling apparatus in accordance with the invention is particularly applicable to and may be embodied in an arrangement or system such as that shown in my copending application Ser. No. 206,089.

One feature of the invention relates to improved means whereby separate orders or lots of articles are segregated at a delivery point or station, for example in a retail merchandising establishment such as that disclosed in my prior application above referred to.

The practical working of the system forming the subject matter of my prior application will be clear from a description of the steps that are taken by a customer in making purchases in a store embodying the invention. A display room is provided where the customer looks over samples of the available merchandise, segregated and classified to facilitate finding the items desired. Each displayed item has a supply of order tickets associated with it and after each selection the customer takes an order ticket covering each item which he desires to purchase.

Next, the customer hands his order ticket or tickets to the cashier who sets up the item number and the price from each ticket on a control station keyboard arranged to record the item numbers and prices and totalize the prices which concurrently operates automatic selecting mechanism by which the desired items are transferred from the stock room to the order assembly unit or wrapping station. The cashier's operations would be somewhat like the tabulating operation of an adding machine. The order ticket may be in the form of a punched card adapted to automatically set up and control the selective mechanism, if desired.

The cashier next tears off the tape record from the control machine, notes the total amount indicated and collects this amount from the customer and hands the tape to the customer. The customer then presents the tape to the wrapping clerk who is thus able to identify the order which is automatically delivered to the wrapping table. The clerk arranges for the wrapping of the order while the customer is paying for it. The entire transaction may thus be completed in a minimum amount of time and without requiring the customer to carry and assemble the items purchased.

The use of this invention makes possible a more effective utilization of the store space, and the stock of goods from which orders are filled may be stored in locations inaccessible for manual handling, for example, in a different room or even on a different floor. This arrangement makes possible more attractive store layouts in which the items for sale are not partially obscured by the requirement for maintaining a large stock of goods in the store proper and a customer may take as much or as little time as he may wish in making his selection without interfering with the service to other customers and yet may secure delivery of the order almost immediately after presenting his order ticket to the cashier. The novelty of the system together with the speedier service constitute further features which appeal to the patrons of the improved store.

Another outstanding advantage of the system is that the possibility of error in filling the order and in computing the cost thereof is reduced to a minimum. The cashier's operations become practically automatic and are not dependent upon memory or mathematical ability, and the mechanism may be operated practically as fast as the cashier can read the number and price of each item or feed the punched card order tickets to the contactor means. In addition, the customer receives a record of the transaction in the form of a sales slip and other copies may be printed on a tape for purposes of record, enabling a perpetual stock inventory to be maintained and permitting detailed studies of the character of all transactions.

As applied to wholesale or warehouse operations, the control station keyboard may be the adding machine portion of a conventional form of billing machine which combines the functions of a typewriter and an adding machine. The order clerk would type the customer's name and address, shipping instructions, etc., on the manifolded order forms and would then list the stock or item number and the price of the various items comprising the order. As each item number was thus being listed, the corresponding item of merchandise comprising that order would be automatically released for segregation at the packing clerk's position where it would be wrapped or packed, after which the order moves on to the shipping clerk's position for routing, etc., then on to delivery platforms.

As applied to the industrial field, particularly to industries where devices or products of varying character are assembled on individual orders, the system based upon this invention would facilitate the handling of items such as bolts, set screws, special parts, and the like that are employed at the assembly lines in factories. It will be evident that the improved system provides an assembly apparatus whereby various sorts of articles stored at different locations may be selectively released in any desired quantity from a central control station or stations and automatically delivered to a desired point. Thus it will be apparent that the system is capable of many different uses and reference herein to an arrangement for a market or retail store is merely illustrative of one application thereof.

Another feature of the invention herein is to provide control means associating the article dispensing mechanism with the order assembly unit. In a market or store, for example, the articles purchased by customers may be automatically assembled together from the stock in a stockroom by the operation of remote-control means for jointly releasing individual items and controlling their assembly into separate orders.

In general terms, the object of the invention is to provide an improved handling or delivery means whereby the items for consecutive orders may be kept separate and wrapped expeditiously and their identity clearly indicated so that no confusion results from a substantially continuous flow of articles to the point of delivery.

Other objects and advantages of the invention will be apparent from the following description of the preferred embodiments thereof shown in the accompanying drawings wherein:

Fig. 1 is a floor plan of a retail store illustrating a preferred arrangement of apparatus embodying the invention;

Fig. 2 is a front view to an enlarged scale of the control station and wrapping counter taken at the point indicated by the line 2—2 in Fig. 1;

Fig. 3 is a diagram of the circuits and apparatus of the control station and wrapping counter;

Fig. 4 is a view showing a typical sales slip;

Figure 5:
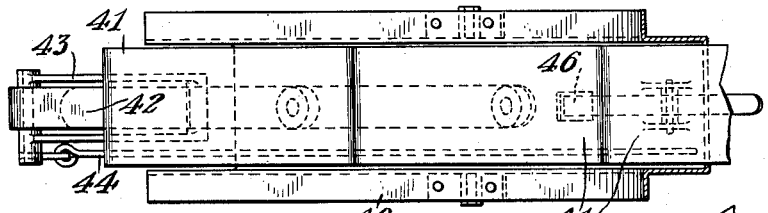
Figs. 5 and 6 are plan and side elevational views, respectively, of one form of dispensing mechanism which may be employed to release wanted articles from stock.

Referring to the drawings there is illustrated in Fig. 1 a floor plan of a retail store, which plan includes a display and sales room 10 containing display racks and tables 11, and wall panels, shelves or cases 12 arranged to suit the character of the items on display. An order and delivery counter 15 is arranged at one side of the room 10 and, as shown, the entrance 16 and exit 17 are so located in relation to the counter 15 that persons leaving the store after being served do not impede the movement of those entering the premises. Remote control apparatus 20 similar to that disclosed in my prior application referred to above and cashier's equipment 21 are arranged at one end of the counter 15. The other end of said counter is devoted to wrapping and delivery stations or positions. A stockroom 25 and article-storage and dispensing apparatus 26 for merchandise may be located at the rear of the storeroom or in any convenient location. The dispensing apparatus 26 is electrically connected by a cable 32 to the control apparatus 20, and is arranged to supply desired articles through suitable conveying means, such as conveyor belt 27, chute 28 and belt 29, to the order assembly unit consisting of wrapping and delivery stations or positions. A "custom service" section 30 with service counter 31 may be provided to take care of the sale of articles subject to individual selection or which are not adapted to be handled effectively in the same manner as the articles handled on a completely mechanized basis.

It will be understood, in accordance with the teaching of my prior invention, that the automatic dispensing apparatus 26 is selectively controlled electrically by the cashier or clerk at the counter 15, preferably by the operation of selective registering mechanism employed to print a record, as illustrated in Fig. 4, of the items ordered and their prices.

In accordance with a feature of the invention, the order assembly unit of the system includes a part of the service counter 15 and the final delivery belt 29. The belt 29 is divided into a plurality of assembly subdivisions or sections arranged side-by-side along the length of the belt, and means is provided for segregating individual orders on these subdivisions in order to facilitate the delivery of a substantially continuous stream of orders without confusion. In the embodiment shown, the conveyor belt 29 is divided transversely, for example by ribs or partitions 33 as shown, into areas corresponding in length to the extent of each of the several delivery positions or stations along the service counter 15 and the belt is moved intermittently or step-by-step for a distance equal to the spacing between the partitions 33 as the filling of separate orders proceeds. As shown, the belt is periodically moved a predetermined distance by a driving motor 34 to transfer articles resting thereon from one position or station to the next each time the contacts 35 are closed at the completion of each order (it may be assumed that usually each order consists of several different articles to be wrapped together and delivered to a customer. The contacts 35 may be associated with the totalizing key of the sales recording and computing unit operating in conjunction with a conventional time delay element to synchronize movement of the delivery belt with completion of delivery of the order to it. This feature of the invention is illustrated in Fig. 3. It will be obvious that different means may be arranged to support and transfer the articles step-by-step from one delivery position or station to another, such as for example a rotating circular table.

In order to facilitate the delivery of an order to the proper customer, the sales slips may be consecutively numbered as issued by the sales recording and computing unit 20, as indicated at 24 (Fig. 4), and a series of numeral counters 37, 37', etc., provided, one for each delivery position or station, said counters being automatically stepped each time the conveyor 29 transfers an order from one station to the next. The counters may then be synchronized with the dispensing and conveying apparatus so that the number opposite each assembled order corresponds with the serial number on the sales slip for that order. Thus if the two hundred and twenty-first order is positioned on the outer end of the belt 29 adjacent the right hand station (Fig. 2), the right hand counter would read "221". Similarly the next counter would read "222", the third counter "223" and the left hand counter 37 would read "224", so that each would correspond with the number on the sales slip for the order at that station. Thus it will be seen that the handling of orders becomes a purely mechanized routine matter.

The control of the delivery belt 29 may be effected in various ways in accordance with the invention, Fig. 3 illustrating a preferred embodiment thereof. The figure shows in enlarged detail the arrangement of the delivery belt 29 with electrical circuits and associated means for properly timing and limiting the intermittent travel of said belt. This disclosure is not intended to limit the scope of the invention to this particular means.

35 represents contacts which are installed on the "total" key of the listing and adding machine or the billing machine which forms the basis of the control center of the system. As the listing of each individual order is completed the "total" key is depressed to cause the total price of the order to be printed on the tape which forms the sales slip 22 (Fig. 4). This operation closes contacts 35 and they remain closed during the printing cycle of the adding mechanism. Closure of these contacts energizes relay magnet 100, and, due to the effect of condenser 101 which is in multiple with it, this relay remains in an energized position for a definite period of time after contacts 35 have opened. This causes relay contacts 102 to open and cut off power from contacts 103 of the adding machine mechanism and the adding machine motor 104 which they control. Connection 105 permits current to be delivered to contacts 103 during the printing cycle. The object of this timed power interruption is to enforce the spacing of successive orders on the main delivery belt far enough apart to overcome any possibility of confusion as they are delivered to the successive segregating stations on belt 29.

Closure of contacts 35 also serves to energize relay magnet 106 and due to its associated condenser 107, it remains energized for a definite period after contacts 35 open. During this period contacts 108 are closed, thus energizing magnet 109 whose armature is thus raised carrying with it ratchet pawl 110. When magnet 109 becomes deenergized, due to the expiration of the time period of relay magnet 106, retractile spring 111 causes pawl 110 to step ratchet 112 ahead one notch. This causes cam 113, which is attached to ratchet 112, to transfer the position of contact spring 114, the function of which will be explained later.

38 and 39 of Fig. 3 represent the drums or pulleys which carry final delivery belt 29 to which are attached the cleats or dividing partitions 33. Attached to one end of each of these cleats is a projecting pin 36. The function of these pins is to engage a travel-limiting switch comprising a star wheel 117 to which is atttached a cam 118 whose function it is to transfer the contact spring 119 each time a pin 36 passes by the star wheel 117, which is thus rotated by engagement of pin 36 with star wheel 117.

Completion of the time cycle of relay 106 as previously detailed would cause the contact spring 114 to be transferred to its lower contacts thus forming a circuit through conductor 115, contact spring 119 and conductor 120 to motor 34, which would thus be energized to drive pulley 38, belt 29 and pulley 39 ahead. This movement would continue until the next succeeding pin 36 would engage star wheel 117 causing the circuit to be broken by contact spring 119, thus stopping motor 34. This transfer of contact 119 mould condition it for a similar actuation upon restoration of contact 114 to the position shown by subsequent operation of magnet 109. The object of these timed actuations is to insure the complete delivery of the entire order from the main conveyor belt before the final delivery belt 29 is stepped ahead.

In Fig. 3 is also illustrated means for stepping ahead the numeral counters 37, 37', etc., which serve to identify the individual orders. The several counters are all connected together for simultaneous operation. This would be accomplished each time a pin 36 passed cam arm 130 causing it to move and to transmit through connecting rod 131 movement to counters 37, 37' and 37".

A typical sales slip 22 shown in Fig. 4 bears a list of item numbers and corresponding prices, with the total at the bottom. The asterisk or mark 23 associated with the fourth item designates an item not carried in the mechanized section and therefore subject to special handling or back ordering. Each slip may also be numbered serially as indicated at 24. Thus the sales slip which is automatically issued by the control mechanism as described not only serves as a record of items and prices for the customer but contains other useful information.

Figure 6:
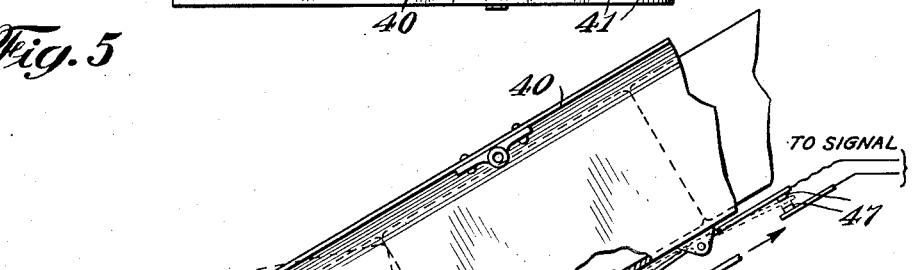

A preferred construction of dispensing or releasing means that may be employed in carrying out the invention is illustrated in Figs. 5 and 6, this construction being claimed in my copending application, Serial No. 423,823, filed December 20, 1941. Referring to these figures of the drawings, the releasing mechanism is illustrated as mounted on the lower end of an inclined support or chute 40 in which packages or articles 41 are arranged to slide to the lower end of the chute as the articles are released, the row of articles normally resting against an abutment 42. A plurality of chutes of varying sizes are arranged in parallel tiers, as shown in Fig. 1, one for each individual supply of articles, and the discharge ends of the respective chutes are positioned to drop a released article upon conveyor means, such as the belt 27, for transferring selected articles to the wrapping stations or delivery counter. Other arrangements for handling the released articles are contemplated and may be utilized to meet the varying conditions encountered in actual practice.

The release mechanism shown in Figs. 5 and 6 comprises a pivoted bell-crank lever 43 having one end thereof extending underneath the forward or lower end of the first article in the chute and the other end of said lever connected to an oscillatory operating rod or link 44. The operating rod 44 is actuated by suitable remote control means, such as an electromagnet (not shown) which is energized by selective controlling means including the keyboard 20 as described in detail in my prior application. It will be apparent that when the bell-crank lever 43 is actuated to the position shown in dotted lines in Fig. 6 by the movement of the operating rod 44, the outer end of the first package 41 is raised above the abutment 42, and the package is forced over the abutment by the pressure of the packages behind it. Thereupon the first package is released and drops upon the conveyor belt or other conveyor means arranged under the end of the chute. The second package engages the lever 43, as indicated by the dotted lines 45 in Fig. 6, and is retained until the operating rod 44 is restored to its normal position so that only one article is released during each cycle of operation.

If desired, the packages in the chute 40 may be positively moved or fed forward as successive units are released, by suitable means of any conventional character. This arrangement permits the inclination of the chute to be reduced and insures positive feeding of the packages to the release or discharge end of the chute. In accordance with another feature of the invention, means such as a pivoted bar or member 46 arranged in the path of the articles 41 may be arranged to control alarm contacts 47 to light a signal lamp or operate an alarm when the supply of packages in the chute 40 is almost exhausted.

Figure 7:
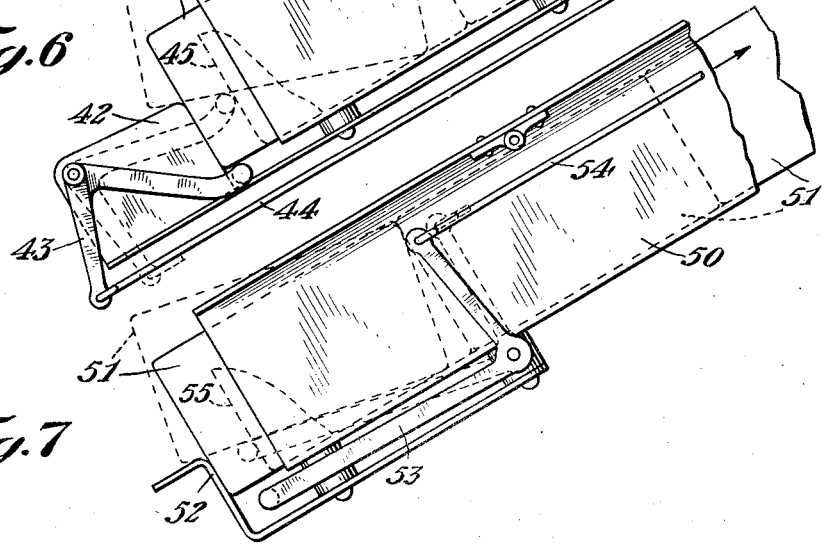
Fig. 7 illustrates a modified form of dispensing mechanism.

A modified construction of the dispensing means is shown in Fig. 7. This construction also comprises an inclined chute 50, corresponding to the chute 40 shown in Figs. 5 and 6, in which a series of packages 51 are arranged to slide to the point of discharge as successive packages are released. The lowermost package normally rests against an abutment 52 formed from a strip of sheet metal secured to the underside of the chute 50. As in the first modification described above, the outer end of the first package is raised over the top of the abutment 52 by a bell-crank lever 53 through the instrumentality of an oscillatory operating rod 54 actuated by an electromagnet (not shown). The second package engages the offset end of the bell-crank lever 53 as shown by the dotted lines 55 until the lever returns to normal at the end of each operating cycle.

It is obvious that among the advantages of a system of this character are the increased effectiveness of the display space which need not be utilized as in the usual market to store a considerable quantity of surplus stock, the rapidity with which orders may be filled since the customer's selection is usually complete before this function is commenced and the check provided on sales and price totals for the benefit of both customer and store, not to mention other ancillary advantages, some of which are referred to above.

Various modifications in the system and apparatus embodying the invention will occur to those skilled in the art. For example, the arrangement of the store equipment shown in Fig. 1 and of the dispensing and handling apparatus shown in Figs. 1, 2 and 3 may be widely varied to meet different conditions without departing from the scope of the invention. Likewise the detailed construction of the remote-controlled dispensing mechanisms shown in Figs. 5 to 7 may be altered depending upon the different applications thereof and the size and character of the articles handled. Thus the means illustrated for storing, feeding and releasing articles may be changed within the scope of the invention as set forth in the appended claims and any suitable automatic or manual arrangement may be utilized to control the same.

I claim:

1. In article handling apparatus for mechanical dispensing systems provided with selective control apparatus for selectively operating the dispensing system to deliver wanted articles, an order assembly unit including a plurality of separate order handling positions adjacent each other, conveyor means for carrying selected articles from the mechanical dispensing system to said assembly unit, means for transferring articles in groups step-by-step from one order handling position to another, and means including the selective control apparatus of the dispensing system for operating said transferring means.

2. In article handling apparatus of the class described, selectively operable dispensing mechanism for assembling orders of wanted articles, conveyor means for carrying selected articles to a point or station where the articles may be checked and stacked and additional conveying or transferring means for transferring the groups of articles from said point to a wrapping and delivery point under the control of the selectively operable dispensing mechanism.

3. In article handling apparatus of the class described, selectively operable dispensing mechanism for assembling groups of articles forming separate orders, said mechanism comprising electrical circuit-controlling means including a keyset, an order assembly unit, supporting means at said assembly unit for the articles to facilitate wrapping and delivery thereof and means in said assembly unit operatively connected to the circuit-controlling means for segregating the groups of articles forming separate orders.

4. In article handling apparatus of the class described, a stock room, an order assembly unit, conveyor means for delivering articles from the stock room to the order assembly unit, means for controlling the selection of particular articles to be delivered to the assembly unit, means in said assembly unit for maintaining groups of articles separate from each other and means whereby the selective control means operates the last-mentioned means.

5. In article handling apparatus of the class described, remote controlled means for selecting and delivering separate groups of articles, means at the point of delivery for segregating said groups and further means for continuously designating each group for identification, said designating means including changeable indicators and means for successively actuating the same as each of said groups reaches a point near the point of delivery.

6. In an article order assembly system wherein stored articles are selected by remote control mechanism, an order assembly unit divided into assembly sections, means for delivering selected articles to a section of said assembly unit and means operatively associated with the selective remote control mechanism for automatically advancing said sections upon completion of each order of articles to present an empty section for receiving the articles of the next succeeding order.

7. In an article order assembly system, means for dispensing articles from stock, selectively operable control mechanism for said dispensing means, said control mechanism embodying a switch to be actuated at the end of the selecting operation of each group of articles to be handled separately, means for assembling the articles delivered by said dispensing means and means in circuit with said switch for preventing the dispensing of further articles from stock for a short period and for causing physical separation of the groups of articles at the point of assembly.

8. In an article order assembly system, means for dispensing articles from stock, selective mechanism including a keyboard for selectively controlling said dispensing means, an order assembly unit including movable article-supporting means divided into sections, means for delivering articles to said assembly unit, means for moving the article-supporting means of said assembly unit and means including a key of said keyboard for controlling said last-mentioned means to separate the assembled articles into groups.

9. In article handling apparatus of the class described, a movable segregating support for articles, said support being divided into sections for separate groups of articles, means for advancing said support, a plurality of changeable number indicators disposed opposite separate sections of the support and means for actuating said indicators in accordance with the serial numbers of the groups of articles, said actuating means including a connection between the movable support and said indicators.

10. In article handling apparatus for mechanical dispensing systems arranged to deliver separate orders of articles through a conveyor means to a delivery station, selectively operable dispensing means for said articles, means at said delivery station for receiving said articles including a movable supporting element, means for intermittently moving said supporting element in a forward direction to advance the articles thereon and remote control mechanism including manually operable elements for controlling said dispensing means and said means for intermittently moving said supporting element whereby the separate orders of articles are segregated at the delivery station.

11. In an article order assembly system, means for dispensing articles from stock, said articles forming a plurality of arbitrary groups or orders, selectively operable control mechanism for said dispensing means, said control mechanism embodying a manually operable switch, means for assembling the articles delivered by said dispensing means, and means in circuit with said switch for preventing the dispensing of further articles from stock for a short period at the end of the selection of each separate group of articles to withhold the delivery of further articles from stock for a short period.

PAUL M. FARMER.